Patented Mar. 14, 1950

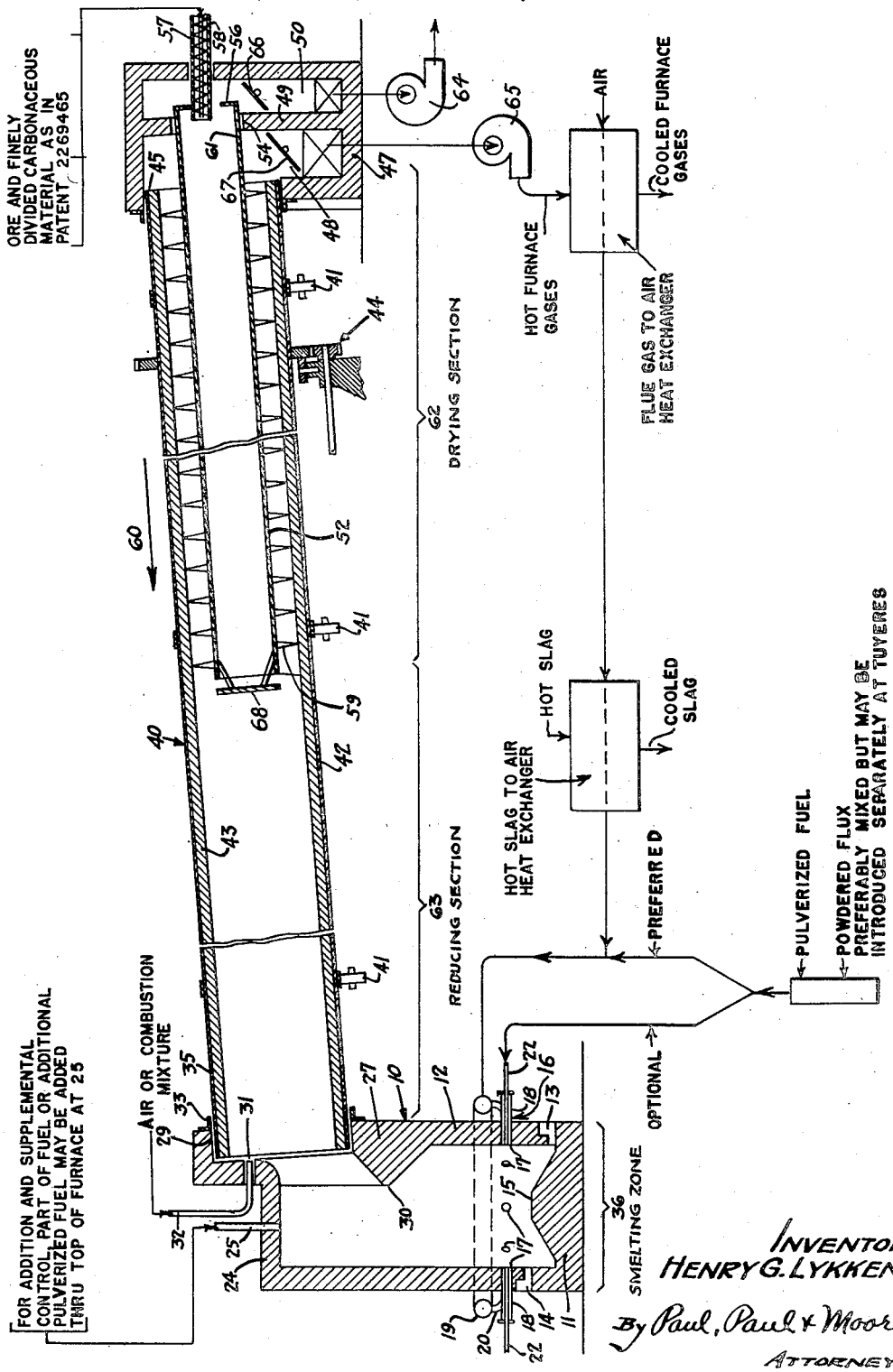

2,500,553

UNITED STATES PATENT OFFICE 2,500,553

APPARATUS FOR SMELTING LOW-GRADE ORES

Henry G. Lykken, Minneapolis, Minn.

Application June 16, 1944, Serial No. 540,722

8 Claims. (Cl. 266—24)

The present invention relates to method and apparatus for utilizing low grade oxygen-containing ores without the necessity of preliminary concentration and particularly to methods and apparatus for smelting low grade iron ore. In the shaft furnace smelting arrangements of the prior art it has not been feasible economically to utilize ores wherein the iron content is much less than 50% and as many naturally occurring ores contain a lesser percentage of iron than this, it has been found necessary, for the utilization of such ores, to effect a preliminary concentration of the ore so as to increase the percentage iron content thereof.

It is an object of this invention to provide a better means for the utilization of low grade ores, particularly iron ore, by direct reduction to the metallic state without the necessity and cost of preliminary concentration. The method and apparatus of the invention are, however, adaptable to the reduction of higher grade iron ores as well as other ores that may be reduced in a blast furnace.

It is well known that the standard blast furnace has definite limitations as to the character of the ore that can be reduced economically. There is not only a definite limit as to the gangue content but also very fine ores are permissible only in relatively small percentages unless sintered or briquetted. For fuel only high grade coke may be used. It is a further object of the invention to provide a method and apparatus for the utilization of low grade iron ore having an iron content of less than 50%, any degree of fineness, a moisture content such as may occur in nature, and it is also an object of the invention to provide the smelting method and apparatus wherein there is no necessity for the use of high grade coke. It is also an object of the invention to provide smelting methods and apparatus capable of utilizing economically iron ores containing as little as 25% iron, and ores which are very fine in character. Indeed, for best utilization it is desirable that the ore be reduced in size if not already fine so that it passes through a one-quarter inch mesh screen, as this allows removal of considerable gangue material in many cases by simple mechanical means. It is contemplated to use pulverized fuel such as may conveniently be available such as charcoal, lignite or any coal reasonably low in sulfur, and it is an object of the invention to provide method and apparatus for such utilization.

Other and further objects of the invention include a method and apparatus capable of smelting ore, particularly low grade ore, at low cost.

In standard blast furnaces the ore, fuel in the form of coke and flux in the form of limestone are fed into the top of the furnace and they pass downwardly through the shaft as the charge at the bottom is melted and withdrawn as slag and metal. The reaction which takes place can be logically defined in three stages. In the top section of the shaft the moisture is driven out of the charge and the charge is preheated to about 600–700° F., below which there is little, if any, chemical action.

In the middle section the oxide is reduced by carbon and carbon monoxide to the metallic state, while in the same zone the limestone is reduced to the oxide and the whole mass heated to a temperature of about 1700° F.

In the lower section the temperature is increased to the melting point of metal and gangue so these will separate and can be separately withdrawn at about 2600–2700° F. At the level of the tuyères the carbon fed at the top, which has not been oxidized above this point, is burned to $CO_2$, generating the high localized melting temperature. At a level immediately above the tuyères this hot $CO_2$ picks up additional carbon, thus generating the reducing gas CO.

In the present invention this same sequence of three stages is utilized, but on an articulated or independent basis so as to permit functional control of each, thus to obtain better distribution and economy of fuel, as well as other advantages not possible in the standard blast furnace.

The invention is illustrated with reference to the drawing which is a schematic side elevational view, partly in section, illustrating a novel and illustrative form of apparatus in which the methods of the invention may be carried out.

Referring to the drawing, there is illustrated a combined smelting apparatus including a shaft furnace section generally designated 10 of relatively low height, as compared to standard blast furnaces. The shaft furnace 10 is preferably of circular cross section and is provided with a base 11 and a circular wall 12. The wall is apertured at 13 for withdrawal of molten metal and is apertured at 14 for withdrawal of slag. The floor of the shaft furnace hearth is built up as indicated at 15 so as to discourage the building up of a frozen pillar of metal in the base of the furnace. At the tuyère level 16 there are provided a plurality of tuyère openings 17 each provided with an inlet tube 18 which is arranged to be fed by a circular manifold 19 and branch manifolds 20. Each of the tuyère tubes 18 is provided with a central tube 22 of smaller diameter extending almost to the interior wall of the shaft furnace. The shaft furnace is provided with a roof at 24 and a burner nozzle 25 for the introduction of fuel, which may be oil, powdered fuel or gas, depending upon the type of fuel available. The side wall of the shaft furnace and roof are built up at 27 so as to provide a circular side-opening 29 into which the lower end 35 of the rotary kiln generally designated 40 extends. The interior of the blast furnace is provided with a downwardly extending spout portion 30 down which the discharge from the rotary kiln 40 slides into the central portion of the shaft furnace. An inlet burner opening is provided at 31 together with a supply pipe 32 for introducing air or a combustion mixture axially into the rotary kiln. The furnace wall is provided with a relatively gas-tight connection at 33 so as to prevent escape of any deleterious quantity of gas where the lower end 35 of the rotary kiln extends into the opening 29 of the shaft furnace section.

The rotary kiln 40 is supported in accordance with usual practice upon a plurality of rolls 41 and is provided with an outer shell 42 and a refractory lining 43. A gear drive is supplied at 44.

The end 45 of the kiln extends into an opening into a compound flue 47 having one flue opening 48, an interior wall 49 and another flue opening 50. Throughout about one-half of the length of the rotary kiln there is provided a concentrically mounted interior tube 52 of smaller diameter than the inner wall of the refractory lining 43. The tube 52 extends beyond the upper end of the rotary kiln main tube, through the stack opening 48 and through an aperture 54 in the intermediate wall 49 and into the interior of flue opening 50. The end of tube 52 is partially sealed off as indicated at the end plate 56 and through a circular opening therein there extends an ore feed tube 57 provided with a feed screw 58 which is rotated at any feeding speed desired.

In the annular space between the interior surface of the refractory lining 43 and the smaller diameter tube 52 of the rotary kiln there is provided a spiral baffle 59 which may be of single or multiple pitch. The spiral baffle 59 may be either right or left hand threaded, as desired, but however made, the direction of rotation of the rotary kiln by means of gear drive 44 is determined so that solid material (dust) which is collected in the spiral turns by the spiral baffle 59 will be progressed, due to the rotation of the spiral, in a direction down the slope of the rotary kiln, as indicated by arrow 60 which is the direction of ore movement through the rotary kiln.

The first two stages of the improved process of the present invention are effected in the rotary kiln 40 which discharges into the vertical type shaft furnace 10 where the smelting or third stage is completed. The ore is fed into the upper end 61 of the tube 52 by means of screw 58 and as the rotary kiln is rotated the ore gradually works down through the tube 52 which constitutes the drying section of the apparatus and discharges onto the refractory lining 43 of the ore reducing section. The drying section is indicated by the bracket 62 whereas the reducing section is indicated by the bracket 63. The smelting zone occurs in the shaft furnace, as indicated over bracket 36.

During operation, the hot reducing gases produced in the shaft furnace 10 flow upwardly through the charge therein and thence axially through the reducing section 63 of the rotary kiln. The outer (upper) end 56 of the drying section tube 52 is nearly blocked off and therefore flow through the tube 52 does not occur very rapidly, but the reducing gases are free to flow through the spiral path determined by the spiral baffle 59 around the tube 52 and thence into the flue 48. The heat of the reducing gases is thus communicated to the walls of the drying tube 52 and hence to the counterflowing ore within tube 52. The drying and preheating of the ore to about 750° F. is accomplished in the tube 52 which is thus indirectly heated by the hot furnace gases passing along the outside of the tube. The moisture vaporized from the ore moving through tube 52 is drawn off through the relatively restricted opening in the center of the end plate 56 of the tube 61, the moisture passing thence to the flue 50 and thence to a stack, not shown. Suitable suction fans 64—65 or dampers 66—67 may be provided so as to regulate the draft applied to the portion 61 of tube 52 extending into the flue 50 and the draft applied to the end of the annular passage part of the rotary kiln, terminating in flue 48. In this way it is possible to effect a fairly accurate separation of the hot reducing gases passing through the annular passageway defined by the spiral baffle 59 and the moisture which is vaporized from the ore in tube 52. The desired operation is achieved when there is substantially no difference of pressure between the lower end of tube 52 and the adjacent end of the annular opening in which the spiral baffle is located. Thus, the moisture produced in tube 52 drifts slowly up the tube 52, and into the flue 50 while the hot reducing gases pass to the spiral passageway into the stack 48, but the draft on tube 52 is not sufficient to suck the reducing gases into the tube, nor is the draft so little as to permit any appreciable amount of water vapor generated in tube 52, to pass around the lower (left) end thereof into the spiral baffle passage. If desired, a disk 68 having a diameter about equal to that of tube 52 may be mounted near the lower end of tube 52 so as to allow only a small annular space for the ore to fall through onto the refractory lining of tube 42 and at the same time provide a partial wall-separation for the gases between the adjacent end of tube 52 and the interior of the furnace.

By draft control principally, and by the use of a baffle, if desired, the moist air and other inert gases of the ore are withdrawn at minimum temperatures and without contaminating the reducing gases. At the same time the hot reducing gases are caused to give off their heat directly to the incoming ore and thus dry and preliminarily heat it. The dust carried by the reducing gases settles during the long passage of those gases through the long spiral chamber 59 and due to the direction of rotation of the kiln 40, the passage of the spiral baffle 59 is arranged so as to progress solid material (dust) downwardly along the spiral and thus the dust (which is ore and fuel or partially reduced ore) is thus continuously returned to the reducing section of the kiln.

The largest saving effected by segregating the drying stage from the reducing stage is due to keeping the moisture and inert gases out of the furnace gas, thus increasing the fuel value of the furnace gas by a substantial percentage. In the case of high moisture ores this saving can amount to several hundred pounds of fuel per ton of iron produced. In accordance with my Patent 2,269,465, part of the fuel (in a finely pulverized form) is intimately mixed with the ore fed into the apparatus at feed screw 58 and if lignitious fuel, particularly, is admixed with the incoming ore, a reducing action begins in the lower end of the drying section adjacent the reducing section at temperatures below 750° F. By this means some of the inert $CO_2$ generated may be withdrawn along with the moisture, thus further increasing the heat value of the furnace gases. No furnace gas is drawn into the preheating kiln.

In the reducing section 63 of the rotary kiln the second stage of the reaction takes place, reducing the oxide to the metallic state by the carbon monoxide in the furnace gas and due to solid carbon reaction, where carbonaceous material is added to the incoming iron ore. It will be noted that adequate fuel may be added to the ore in pulverized form to reduce all the oxygen in the ore and to maintain the desired and required $CO_2$ content in the gas. This demand is approximately 645 pounds of carbon for each 2000 pounds of iron produced. Additional amounts of carbonaceous material added to the ore discharge mixed with the deoxidized ore, into the shaft furnace section 10 to reduce the desired amount of $CO_2$ to CO and thus furnish the desired reducing gas to the rotary kiln. A considerable degree of operational control is thus made possible by the controlled addition of solid pulverized carbonaceous material to the ore fed into the system.

The shaft furnace 10 is short and has a shallow burden of material above the melting zone which is at or slightly above the level of tuyères 16. The construction of the shaft furnace 10 is quite similar to the hearth and bosh sections of a standard blast furnace, but the operation is novel. Preheated air, preferably preheated to 1250° F. or over, is used. This air is heated by heat exchangers utilizing furnace gas discharged at flue 48 or by the utilization of the heat of the slag in a manner such as used in the Portland cement industry. The thus heated air is introduced into the shaft furnace section 10 and with it there is also introduced smelting fuel and optionally powdered flux. The flux is first reduced to an oxide in an auxiliary furnace, utilizing part of the furnace gas as fuel. This is a material saving as it keeps the moisture and inert $CO_2$ in the stone, out of the furnace gases, thus reducing the contamination of the furnace gases. The flux is fed in finely pulverized form so that it reacts instantly with the gangue material at the precise point where reaction takes place. A large saving of flux may thus be effected, in some cases up to 50%. The fuel and flux may be instantly adjusted to requirement and temperature maintenance at any desired point.

The pulverized fuel and pulverized flux are preferably mixed together and introduced axially in the hot air tuyères. The introduction of fuel alone tends to cake and stick, but mixed with part or all of the flux the mixture may be heated to the ignition temperature of the fuel and higher and will still remain in the pulverized condition until entering the furnace. It is therefore the preferred form of the invention to introduce the flux mixed with the fuel, although the two may be introduced separately, suitable arrangements being made to maintain the tuyères open. The introduction of part or all of the fuel and flux with the heated air is a preferred arrangement as this admits of controlling the flame length by varying the fuel-flux ratio. An increase in proportion of flux to fuel decreases the flame length. The metal is tapped at tap hole 13 and slag is tapped at 14 in accordance with standard blast furnace practice. The invention provides however for a domed hearth at 15 to facilitate drainage of the metal and to minimize the tendency of metal to build up and freeze at the bottom of the furnace.

For additional and supplemental control of the furnace operation, part of the fuel or additional pulverized fuel may be added through the top of the shaft furnace at 25 to increase the CO content by reducing some of the $CO_2$ permitted to be generated in the shaft. This is an endothermic reaction that lowers the temperature of the gas in the top of furnace 10, before entering the rotary section. Heated air may then be supplied to the rotary kiln 40 at nozzle 31 to oxidize part of the CO to $CO_2$ which is a highly exothermic reaction for increasing the heat in the rotary kiln. In this manner complete CO and $CO_2$ ratio and temperature control can be maintained and instantly adjusted without fuel loss as any additional fuel that may be used will appear as usable combustibles in the exit gases at flue 48.

The method and apparatus of the present invention provides a system of ore reducing that is free from the wandering, fluctuating and reversing reactions that are characteristic of the usual blast furnace and are largely responsible for the absorption of sulphur and phosphorus by the iron. In the present invention there is a straight line, progressive, controllable, and non-reversing reduction in which much of the sulphur is left free to go out with the gases without affecting the iron and with better control conditions for elimination of both sulfur and phosphorus with the slag.

The furnace can be taken in and out of service for repairs at low cost in comparison with the ordinary shaft furnace, which is in itself a large saving.

It is contemplated that the features of this invention may be utilized in various structures. The reduction of the ore or a partial reduction may be effected in the shaft furnace using only the drier and preheating section of the rotary kiln and discharging into the shaft 10 at approximately 750° F. One part of the reduction may be effected in the rotary section and part in the shaft section.

As many apparently widely different embodiments of this invention may be made without departing from the spirit and scope thereof, it is to be understood that I do not limit myself to the specific embodiments herein except as defined by the appended claims.

What I claim is:

1. A smelting furnace for low grade iron ore comprising in combination, a blast furnace having tuyère means for introducing a blast of air and combustible fuel into the blast furnace for smelting the charge therein, a rotary kiln connected in gas-conducting relation to the top of the blast furnace for conveying away the hot reducing gases produced in the blast furnace, said rotary kiln being positioned so as to discharge into the blast furnace, said rotary kiln including a reducing section communicating with the blast furnace and an ore drying section communicating with the reducing section, means for conducting the hot reducing gases produced in the blast furnace through the reducing section of the rotary kiln in contact with the ore moving through said reducing section and thence out of contact with the ore in the drying section but in heat conducting relation to the ore for drying the ore, and means for separately conducting away the moisture vapors of the ore being dried.

2. The apparatus of claim 1 further characterized in that the rotary kiln has a double walled drying section for separating the ore being dried from the reducing gases.

3. The apparatus of claim 1 further characterized in that the drying section of the rotary kiln has a double wall so as to present an axial bore and an annular space, one of which is provided with a spiral screw for causing the reducing gases to traverse a spiral path so as to cause ore dust carried thereby to be deposited, and means for rotating the rotary kiln to progress dust so collected in the direction of ore movement through the rotary kiln and countercurrent to the movement of the reducing gases.

4. A rotary kiln for drying and reducing ore comprising a long tube, a short tube of lesser diameter positioned annularly within the long tube so as to extend part way therethrough, means for feeding ore into the end of the smaller tube and for withdrawing moisture vapor therefrom, a closure at the discharge end of the short tube, closing the end of said tube except for a small ore discharge area, and means for drawing hot reducing gas through the long tube and thence through the annular space between the long tube and smaller tube.

5. A rotary kiln for drying and reducing ore comprising a long tube, a short tube of lesser diameter positioned annularly within the long tube so as to extend part way therethrough, means for feeding ore into the end of the smaller tube and for withdrawing moisture vapor therefrom, a spiral web positioned in the annular space between the short and long tubes, means for rotating the tubes and spiral web in a direction so as to progress solid material collected in the spiral in the direction countercurrent to the movement of the hot reducing gases therethrough, and means for drawing hot reducing gas through the long tube and thence through the annular space between the long tube and the smaller tube.

6. A rotary kiln for drying and reducing ore comprising a long tube mounted for rotation about a slightly tilted axis, a shorter tube of lesser diameter mounted co-axially within the long tube and extending from a position beyond the end of the long tube to between the ends thereof, a closure at the discharge end of the short tube, closing the end of said tube except for a small ore discharge area, and separate flues connected to the protruding end of the shorter tube and to the annular passage formed between the tubes.

7. A rotary kiln for drying and reducing ore comprising a long tube mounted for rotation about a slightly tilted axis, a shorter tube of lesser diameter mounted coaxially within the long tube and extending from a position beyond the end of the long tube to between the ends thereof, a spiral baffle having its axis coincident with that of the tubes positioned in the annular space between the tubes so as to form a spiral passage therein and separate flues connected to the protruding ends of the shorter tube and to the annular passage formed between the tubes.

8. The apparatus of claim 7 further characterized in that the spiral baffle has a multiple pitch.

HENRY G. LYKKEN.

REFERENCES CITED

The following references are of record in the file of this patent:

UNITED STATES PATENTS

| Number | Name | Date |
|---|---|---|
| 282,266 | Bull | July 31, 1883 |
| 413,552 | Pratt | Oct. 22, 1889 |
| 502,482 | Dauber | Aug. 1, 1893 |
| 719,320 | Foster | Jan. 27, 1903 |
| 1,366,479 | Newberry | Jan. 25, 1921 |
| 1,403,576 | Stansfield | Jan. 17, 1922 |
| 1,599,885 | Grace | Sept. 14, 1926 |
| 1,796,871 | Madorsky | Mar. 17, 1931 |
| 1,864,593 | Gustafsson | June 28, 1932 |
| 1,871,848 | Gustafsson | Aug. 16, 1932 |
| 1,880,012 | Brassert | Sept. 27, 1932 |
| 1,997,603 | Spalding | Apr. 16, 1935 |
| 2,035,550 | Karwat | Mar. 31, 1936 |
| 2,292,579 | Moore | Aug. 11, 1942 |